United States Patent
Bennah et al.

(10) Patent No.: US 9,298,442 B2
(45) Date of Patent: *Mar. 29, 2016

(54) DYNAMIC PROTECTION OF ONE OR MORE DEPLOYED COPIES OF A MASTER OPERATING SYSTEM IMAGE

(71) Applicant: INTERNATIONAL BUSINESS MACHINES CORPORATION, Armonk, NY (US)

(72) Inventors: Albert D. Bennah, Cary, NC (US); Adrian X. Rodriguez, Durham, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/659,116

(22) Filed: Oct. 24, 2012

(65) Prior Publication Data
US 2014/0101422 A1   Apr. 10, 2014

Related U.S. Application Data

(63) Continuation of application No. 13/645,808, filed on Oct. 5, 2012.

(51) Int. Cl.
*H04L 12/24* (2006.01)
*G06F 9/445* (2006.01)
*G06F 11/30* (2006.01)

(52) U.S. Cl.
CPC .............. *G06F 8/63* (2013.01); *G06F 11/3055* (2013.01); *H04L 41/0816* (2013.01); *G06F 11/3003* (2013.01); *G06F 2201/865* (2013.01)

(58) Field of Classification Search
None
See application file for complete search history.

(56) References Cited

U.S. PATENT DOCUMENTS 6,272,626 B1 *  8/2001  Cobbett .......................... 713/2
6,330,715 B1 * 12/2001  Razzaghe-Ashrafi ........ 717/171
(Continued)

FOREIGN PATENT DOCUMENTS

WO   WO 2012/048030 A2   4/2012

OTHER PUBLICATIONS

Choi, H., et al., "Autonomous Learning for Efficient Resource Utilization of Dynamic VM Migration", ICS'08, Jun. 2008, pp. 185-194, ACM, USA.

(Continued)

*Primary Examiner* — Jason Mitchell
(74) *Attorney, Agent, or Firm* — Edward J. Lenart; Grant A. Johnson; Kennedy Lenart Spraggins LLP

(57) ABSTRACT

Methods, apparatuses, and computer program products for dynamic protection of one or more deployed copies of a master operating system image are provided. Embodiments include monitoring, by an image deployment monitor, an operational state of a deployed copy of a master operating system (OS) image; detecting, by the image deployment monitor, a change in the operational state of the deployed copy of the master OS image; in response to detecting the change, generating, by the image deployment monitor, a configuration recommendation to prevent the change from occurring in operational states of one or more other deployed copies of the master OS image; and providing, by the image deployment monitor, the configuration recommendation to the one or more other deployed copies of the master OS image.

6 Claims, 4 Drawing Sheets

(56) References Cited

U.S. PATENT DOCUMENTS

| | | | |
|---|---|---|---|
| 6,513,115 B2* | 1/2003 | Nock et al. | 713/100 |
| 7,240,107 B2 | 7/2007 | Chase-Salerno | |
| 7,600,216 B2 | 10/2009 | Shlomai | |
| 7,694,280 B2 | 4/2010 | James et al. | |
| 7,757,214 B1 | 7/2010 | Palczak et al. | |
| 7,802,246 B1 | 9/2010 | Kennedy et al. | |
| 7,890,951 B2 | 2/2011 | Vinberg | |
| 8,117,168 B1 | 2/2012 | Stringham | |
| 8,181,174 B2 | 5/2012 | Liu | |
| 8,219,983 B1 | 7/2012 | Sobel et al. | |
| 8,239,509 B2 | 8/2012 | Ferris et al. | |
| 8,296,251 B1 | 10/2012 | Athayde | |
| 8,347,280 B2 | 1/2013 | Swarna | |
| 8,352,608 B1 | 1/2013 | Keagy et al. | |
| 8,381,191 B2 | 2/2013 | Mondal | |
| 8,423,958 B2 | 4/2013 | Velupillai | |
| 8,429,630 B2 | 4/2013 | Nickolov | |
| 8,468,518 B2 | 6/2013 | Wipfel | |
| 8,612,566 B2 | 12/2013 | Ferris et al. | |
| 8,627,293 B2 | 1/2014 | Perrone et al. | |
| 8,635,686 B2* | 1/2014 | Sriram | 726/12 |
| 8,869,135 B1 | 10/2014 | Fitzgerald et al. | |
| 8,990,772 B2 | 3/2015 | Bennah | |
| 8,990,796 B2 | 3/2015 | Lamantia | |
| 2002/0124245 A1 | 9/2002 | Maddux | |
| 2003/0051128 A1 | 3/2003 | Rodriguez et al. | |
| 2004/0025154 A1 | 2/2004 | Sedlack | |
| 2004/0153478 A1 | 8/2004 | Igouchkine | |
| 2004/0162876 A1* | 8/2004 | Kohavi | 709/203 |
| 2004/0181776 A1 | 9/2004 | Atkin et al. | |
| 2004/0230731 A1 | 11/2004 | Arimilli et al. | |
| 2005/0235352 A1* | 10/2005 | Staats et al. | 726/14 |
| 2006/0037016 A1 | 2/2006 | Saha | |
| 2006/0161895 A1 | 7/2006 | Speeter et al. | |
| 2006/0184937 A1 | 8/2006 | Abels et al. | |
| 2006/0248139 A1* | 11/2006 | Sundar | 709/202 |
| 2006/0248513 A1 | 11/2006 | Foster et al. | |
| 2007/0180509 A1* | 8/2007 | Swartz et al. | 726/9 |
| 2007/0226358 A1* | 9/2007 | Krywaniuk | 709/229 |
| 2007/0240151 A1 | 10/2007 | Marl | |
| 2007/0283324 A1 | 12/2007 | Geisinger | |
| 2007/0283329 A1 | 12/2007 | Caprihan et al. | |
| 2008/0052675 A1 | 2/2008 | Wookey | |
| 2008/0098379 A1 | 4/2008 | Newman et al. | |
| 2008/0104573 A1 | 5/2008 | Singla et al. | |
| 2008/0141010 A1 | 6/2008 | Crowell et al. | |
| 2008/0141217 A1 | 6/2008 | Goetz et al. | |
| 2008/0155534 A1 | 6/2008 | Boss et al. | |
| 2008/0184200 A1 | 7/2008 | Burns et al. | |
| 2009/0016220 A1 | 1/2009 | Uysal et al. | |
| 2009/0019438 A1 | 1/2009 | Madduri et al. | |
| 2009/0019535 A1* | 1/2009 | Mishra et al. | 726/12 |
| 2009/0037680 A1 | 2/2009 | Colbert et al. | |
| 2009/0048993 A1 | 2/2009 | Lohrbach et al. | |
| 2009/0089624 A1 | 4/2009 | Austen et al. | |
| 2009/0100420 A1 | 4/2009 | Sapuntzakis et al. | |
| 2009/0118839 A1 | 5/2009 | Accapadi et al. | |
| 2009/0228868 A1 | 9/2009 | Drukman et al. | |
| 2009/0265707 A1 | 10/2009 | Goodman et al. | |
| 2009/0300057 A1 | 12/2009 | Friedman | |
| 2009/0300149 A1 | 12/2009 | Ferris et al. | |
| 2009/0300151 A1 | 12/2009 | Friedman et al. | |
| 2009/0300607 A1 | 12/2009 | Ferris et al. | |
| 2009/0300641 A1 | 12/2009 | Friedman et al. | |
| 2009/0300707 A1* | 12/2009 | Garimella et al. | 726/1 |
| 2010/0037207 A1 | 2/2010 | Chambers et al. | |
| 2010/0153443 A1 | 6/2010 | Gaffga et al. | |
| 2010/0192143 A1 | 7/2010 | Ingle et al. | |
| 2010/0229175 A1 | 9/2010 | Gonzalez et al. | |
| 2010/0257523 A1 | 10/2010 | Frank | |
| 2010/0274890 A1 | 10/2010 | Patel et al. | |
| 2010/0325410 A1 | 12/2010 | Fitzgerald et al. | |
| 2010/0332637 A1 | 12/2010 | Doi et al. | |
| 2010/0332890 A1 | 12/2010 | Chen et al. | |
| 2011/0016414 A1 | 1/2011 | Ernst et al. | |
| 2011/0126168 A1 | 5/2011 | Ilyayev | |
| 2011/0131301 A1* | 6/2011 | Klein et al. | 709/220 |
| 2011/0145789 A1 | 6/2011 | Rasch et al. | |
| 2011/0154320 A1 | 6/2011 | Verma | |
| 2011/0161952 A1 | 6/2011 | Poddar et al. | |
| 2011/0173605 A1 | 7/2011 | Bourne | |
| 2012/0030459 A1* | 2/2012 | Aldridge et al. | 713/153 |
| 2012/0030672 A1 | 2/2012 | Zygmuntowicz et al. | |
| 2012/0054868 A1 | 3/2012 | Ramalingam | |
| 2012/0079474 A1 | 3/2012 | Gold et al. | |
| 2012/0084414 A1 | 4/2012 | Brock et al. | |
| 2012/0084752 A1 | 4/2012 | Arnold et al. | |
| 2012/0102160 A1 | 4/2012 | Breh et al. | |
| 2012/0102481 A1 | 4/2012 | Mani et al. | |
| 2012/0131577 A1 | 5/2012 | Arcese et al. | |
| 2012/0159471 A1 | 6/2012 | de Souza et al. | |
| 2012/0167048 A1 | 6/2012 | Walsh et al. | |
| 2012/0246619 A1 | 9/2012 | Thirumalai et al. | |
| 2012/0278797 A1 | 11/2012 | Secrist et al. | |
| 2012/0284405 A1 | 11/2012 | Ferris et al. | |
| 2013/0067049 A1* | 3/2013 | Ghosh et al. | 709/221 |
| 2013/0080619 A1 | 3/2013 | Assuncao et al. | |
| 2013/0080997 A1 | 3/2013 | Dattathreya | |
| 2013/0125107 A1 | 5/2013 | Bandakka et al. | |
| 2013/0138718 A1 | 5/2013 | Mallur et al. | |
| 2013/0332921 A1 | 12/2013 | Khutornenko et al. | |
| 2014/0033188 A1 | 1/2014 | Beavers et al. | |
| 2014/0033189 A1 | 1/2014 | Buswell | |
| 2014/0040438 A1 | 2/2014 | Donahue et al. | |
| 2014/0052683 A1 | 2/2014 | Kirkham et al. | |
| 2014/0075172 A1* | 3/2014 | Knichel et al. | 713/2 |
| 2014/0101421 A1 | 4/2014 | Bennah et al. | |
| 2014/0101428 A1 | 4/2014 | Bennah et al. | |
| 2014/0101429 A1 | 4/2014 | Bennah et al. | |
| 2014/0101430 A1 | 4/2014 | Bennah et al. | |
| 2014/0101431 A1 | 4/2014 | Bennah et al. | |
| 2014/0108774 A1 | 4/2014 | Bennah et al. | |
| 2014/0108779 A1 | 4/2014 | Bennah et al. | |
| 2014/0108951 A1 | 4/2014 | Dharawat et al. | |
| 2014/0157056 A1 | 6/2014 | Bennah et al. | |
| 2014/0259009 A1 | 9/2014 | Bhattiprolu | |

OTHER PUBLICATIONS

Venners, B., "Inside the Java Virtual Machine", Chapter 5 of Inside the Java Virtual Machine, www.artima.com (online), [accessed Jul. 6, 2012], 1-53 pp., URL: http://www.artima.com/insidejvm/ed2/jvmP.html.

Hudson, "Hyper-V Virtual Machine (VM) Parent-Child Configuration Using Differencing Disks", Microsoft TechNet Article, Sep. 2010, [accessed Aug. 7, 2012], 2 pp., URL: http://social.technet.microsoft.com/wiki/contents/articles/1393.hyper-v-virtual-machine-vm-parent-child-configuration-using-differencing-disks.aspx.

"vsphere 5: Updating/Installing profile or vib using esxcli", virtualvm.info (online), May 2012, [accessed Aug. 7, 2012], 3 pp., URL: http://virtualvm.info/?p=170.

Office Action, U.S. Appl. No. 13/645,808, Jul. 24, 2014, pp. 1-12.
Office Action, U.S. Appl. No. 13/646,020, May 23, 2014, pp. 1-16.
Office Action, U.S. Appl. No. 13/653,090, May 30, 2014, pp. 1-25.
Office Action, U.S. Appl. No. 13/658,937, May 21, 2014, pp. 1-21.

Oasysadmin, "Copying, moving and replicating the MDT 2010 deployment share", Nov. 2011, pp. 1-9, oasysadmin.com (online), URL: oasysadmin.com/2011/11/03/copying-moving-and-replicating-the-mdt-2010-deployment-share/.

Bell et al., "Configuration Description, Deployment, and Lifecycle Management (CDDLM) Foundation Document", GFD.50, Aug. 2005, 37 pages, Global Grid Forum (online), URL: www.ogf.org/documents/GFD.50.pdf.

Rasmussen et al., "Managing WebSphere DataPower Device configurations for high availability, consistency, and control, Part 2: Application promotion strategies", IBM developerWorks, WebSphere Technical Library, Apr. 2009, 15 pages, IBM developerWorks (online), URL: www.ibm.com/developerworks/websphere/library/techarticles/0904_rasmussen/0904_rasmussen.html.

(56) References Cited

OTHER PUBLICATIONS

Zhang et al., "CCOA: Cloud Computing Open Architecture", IEEE International Conference on Web Services (ICWS), Jul. 2009, pp. 607-616, IEEE Xplore Digital Library (online), DOI: 10.1109/ICWS.2009.144.

Waldspurger, "Memory Resource Management in VMware ESX Server", ACM SIGOPS Operating Systems Review—OSDI '02: Proceedings of the 5th symposium on Operating systems design and implementation, Dec. 2002, pp. 181-194, vol. 36, Issue SI, ACM New York NY, DOI: 10.1145/844128.844146.

Badger et al., "Draft Cloud Computing Synopsis and Recommendations", National Institute of Standards and Technology (NIST) special publication 800-146, May 2012, 84 pages, nist.gov (online), URL: http://citeseerx.ist.psu.edu/viewdoc/download?doi=1 0.1.1.232.3178&rep=rep1 &type=pdf.

Makris et al., "Dynamic and Adaptive Updates of Non-Quiescent Subsystems in Commodity Operating System Kernels", Proceedings of the 2nd ACM SIGOPS/EuroSys European Conference on Computer Systems (EuroSys'07), vol. 41, Issue 3, Jun. 2007, pp. 327-340, ACM New York, NY, USA.

Chieu et al., "Virtual Machines with Sharable Operating System", Proceedings of the ACM International Conference Companion on Object Oriented Programming Systems Languages and Applications Companion (OOPSLA'11), Oct. 2011, pp. 109-114, 5 pages, ACM New York, NY, USA.

White, "How to Deploy Entire Systems in Mac OS X 10.5", chapter from Apple Training Series: Mac OS X Deployment v10.5, peachpit.com (online), Aug. 20, 2008, pp. 1-9, Pearson Education, Peachpit Press, San Francisco, CA, USA.

Wentzlaff et al., "An Operating System for Multicore and Clouds: Mechanisms and Implementation", Proceedings of the 1st ACM Symposium on Cloud Computing (SoCC'10), Jun. 2010, pp. 1-10, ACM New York, NY, USA.

Scarfone et al., "Guide to Security for Full Virtualization Technologies", Jan. 2011, 35 pages, National Institute of Standards and Technology, Gaithersburg, MD, USA.

\* cited by examiner

US 9,298,442 B2

DYNAMIC PROTECTION OF ONE OR MORE DEPLOYED COPIES OF A MASTER OPERATING SYSTEM IMAGE

CROSS-REFERENCE TO RELATED APPLICATION

This application is a continuation application of and claims priority from U.S. patent application Ser. No. 13/645,808, filed on Oct. 5, 2012.

BACKGROUND OF THE INVENTION

1. Field of the Invention

The field of the invention is data processing, or, more specifically, methods, apparatuses, and computer program products for dynamic protection of one or more deployed copies of a master operating system image.

2. Description of Related Art

In modern data centers, system administrators often maintain a collection of master operating system (OS) images that are reserved for deployment unto new systems as these systems become operational. A master OS image is a boot device image that includes a representation of a computer program and its related data such as a kernel, file system, and libraries at a particular given point in time. Master OS images or "Golden" master OS images imply a degree of trust and stability based on prior quality assessments performed against them. After creating a master OS image, threats may arise that challenge the integrity of the configuration of the master OS image.

SUMMARY OF THE INVENTION

Methods, apparatuses, and computer program products for dynamic protection of one or more deployed copies of a master operating system image are provided. Embodiments include monitoring, by an image deployment monitor, an operational state of a deployed copy of a master operating system (OS) image; detecting, by the image deployment monitor, a change in the operational state of the deployed copy of the master OS image; in response to detecting the change, generating, by the image deployment monitor, a configuration recommendation to prevent the change from occurring in operational states of one or more other deployed copies of the master OS image; and providing, by the image deployment monitor, the configuration recommendation to the one or more other deployed copies of the master OS image.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
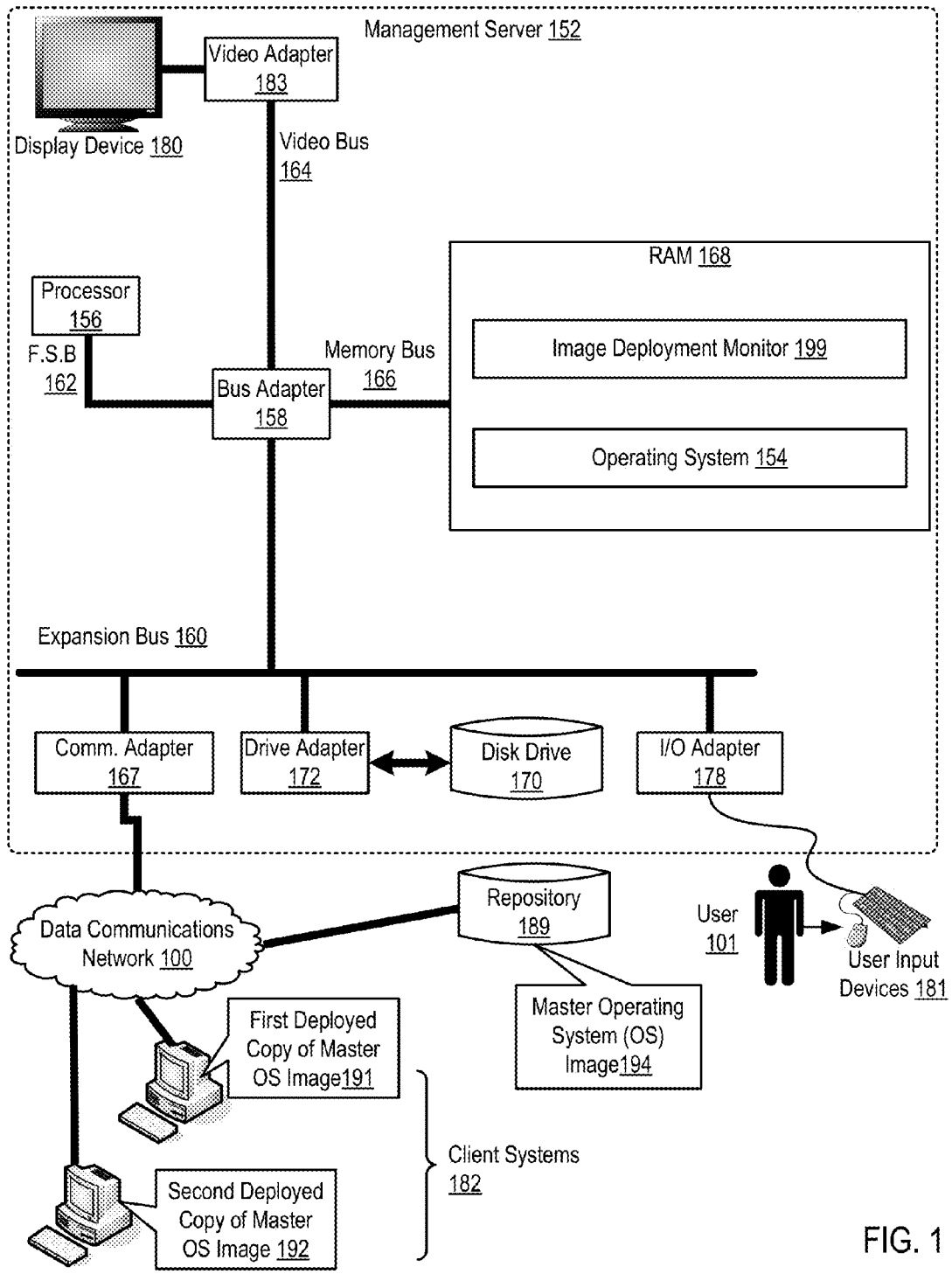
FIG. 1 sets forth a block diagram of automated computing machinery comprising an exemplary management server useful in dynamic protection of one or more deployed copies of a master operating system image according to embodiments of the present invention.

Exemplary methods, apparatuses, and computer program products for dynamic protection of one or more deployed copies of a master operating system image in accordance with the present invention are described with reference to the accompanying drawings, beginning with FIG. 1. Dynamic protection of one or more deployed copies of a master operating system image in accordance with the present invention is generally implemented with computers, that is, with automated computing machinery. For further explanation, therefore, FIG. 1 sets forth a block diagram of automated computing machinery comprising an exemplary management server (152) useful in dynamic protection of one or more deployed copies of a master operating system image according to embodiments of the present invention. The management server (152) of FIG. 1 includes at least one computer processor (156) or 'CPU' as well as random access memory (168) ('RAM') which is connected through a high speed memory bus (166) and bus adapter (158) to processor (156) and to other components of the management server (152).

Stored in RAM (168) is an image deployment monitor (199) that includes computer program instructions for dynamic protection of one or more deployed copies of a master operating system image according to embodiments of the present invention. Specifically, the image deployment monitor (199) includes computer program instructions that when executed by the computer processor (156) cause the image deployment monitor (199) to carry out the step of monitoring an operational state of a deployed copy of a master operating system (OS) image. In the example of FIG. 1, the management server (152) is configured to monitor deployed copies (191, 192) on client systems (182) where the original master OS image (194), from which the copies (191, 192) were deployed, resides within a repository (189).

The image deployment monitor (199) also includes computer program instructions that when executed by the computer processor (156) cause the image deployment monitor (199) to carry out the step of detecting a change in the operational state of the deployed copy (191, 192) of the master OS image (194). An operational state of a deployed copy may be any type of monitorable characteristics related to the deployed copy, such as a physical state of the system upon which the copy is deployed; server performance; network performance; and security. Examples of changes in the operational state of a deployed copy include system errors or failure to communicate with a peripheral device.

The image deployment monitor (199) also includes computer program instructions that when executed by the computer processor (156) cause the image deployment monitor (199) to carry out the steps of generating in response to detecting the change, a configuration recommendation to prevent the change from occurring in operational states of one or more other deployed copies of the master OS image; and providing, by the image deployment monitor (199), the configuration recommendation to the one or more other deployed copies of the master OS image.

By using a configuration recommendation to prevent a change detected in a deployed copy of a master OS image (194), from occurring in other concurrently deployed copies, the image deployment monitor (199) may protect the other deployed copies against threats that have arisen after the creation of the master OS image. Thus, the image deployment monitor provides dynamic protection to the deployed copies of the master OS image.

Also stored in RAM (168) is an operating system (154). Operating systems useful dynamic protection of one or more deployed copies of a master operating system image according to embodiments of the present invention include UNIX™, Linux™, Microsoft XP™, AIX™, IBM's i5/OS™, and others as will occur to those of skill in the art. The operating system (154) and the image deployment monitor (199) in the example of FIG. 1 are shown in RAM (168), but many components of such software typically are stored in non-volatile memory also, such as, for example, on a disk drive (170).

The management server (152) of FIG. 1 includes disk drive adapter (172) coupled through expansion bus (160) and bus adapter (158) to processor (156) and other components of the management server (152). Disk drive adapter (172) connects non-volatile data storage to the management server (152) in the form of disk drive (170). Disk drive adapters useful in computers for dynamic protection of one or more deployed copies of a master operating system image according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example management server (152) of FIG. 1 includes one or more input/output ('I/O') adapters (178). I/O adapters implement user-oriented input/output through, for example, software drivers and computer hardware for controlling output to display devices such as computer display screens, as well as user input from a user 101 using user input devices (181) such as keyboards and mice. The example management server (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary management server (152) of FIG. 1 includes a communications adapter (167) for data communications with the repository (189) and other computers, such as client computers (182) via a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamic protection of one or more deployed copies of a master operating system image according to embodiments of the present invention include modems for wired dial-up communications, Ethernet (IEEE 802.3) adapters for wired data communications network communications, and 802.11 adapters for wireless data communications network communications.

Figure 2:
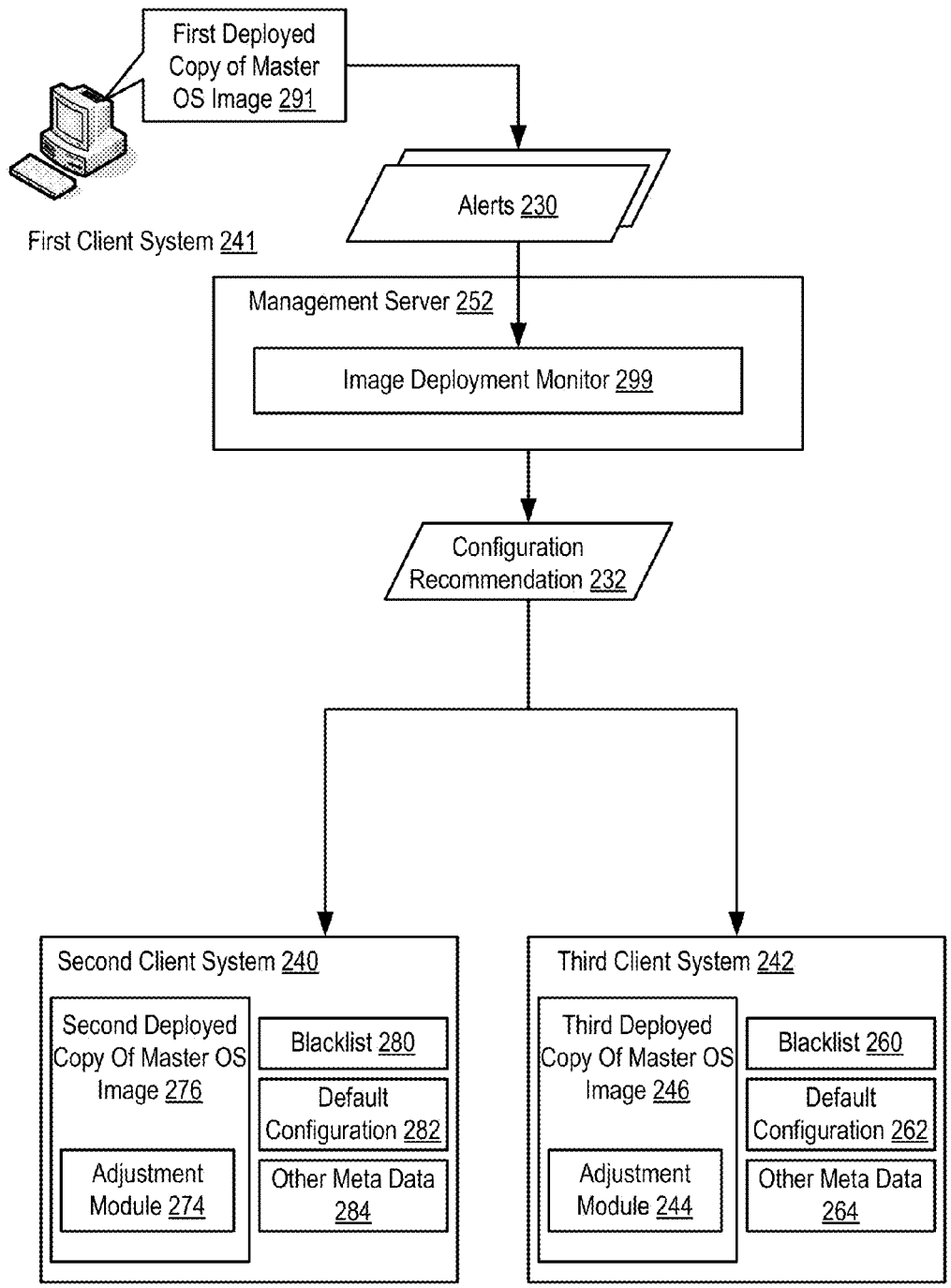
FIG. 2 sets forth a block diagram of a system comprising another example management server useful in dynamic protection of one or more deployed copies of a master operating system image according to embodiments of the present invention.

For further explanation, therefore, FIG. 2 sets forth a block diagram of a system comprising another example management server (252) useful in dynamic protection of one or more deployed copies of a master operating system image according to embodiments of the present invention.

The system of FIG. 2 includes a management server (252) with an image deployment monitor (299) configured to monitor concurrently deployed copies of a master OS image. In the example of FIG. 2, the image deployment monitor (299) monitors a first deployed copy (291) deployed upon a first client system (241), a second deployed copy (276) on a second client system (240), and a third deployed copy (246) on a third client system (242). In the example of FIG. 2, only three deployed copies of a single master OS image are illustrated but the image deployment monitor (299) may be configured to monitor any number of deployed copies of any number of master OS images.

In the example of FIG. 2, the second deployed copy (276) and the third deployed copy (246) each has a directory that includes an associated blacklist (280, 260), a default configuration (282, 262), and other meta data (284, 264). A blacklist is a list indicating software modules that have been identified as creating problems on one or more deployed copies of the master OS image. That is, each software module listed in the blacklist has been associated with a negative change in an operational state of a deployed copy of a master OS image. The deployed copies may be configured to use the blacklists to determine which software modules should be prevented from being installed on the deployed copies. A default configuration is a collection of settings associated with deployment of a copy of a master OS image. For example, a default configuration may indicate how a particular drive is to be partitioned, memory allocated, and CPU and network bandwidth distributed. Other meta data may include rules, procedures, or any other type of information that may relate to deployment and execution of a copy of a master OS image.

During operation, the image deployment monitor (299) may receive one or more alerts (230) from the first deployed copy (291). An alert may indicate an operational state of the deployed copy (291). Examples of operational states may include a system error or loss of contact with a peripheral device. An alert may also indicate a configuration change in the first deployed copy (291). Examples of configuration changes may include installation of a software component, such as a device driver, or modification of a resource allocation, such as changing the size of memory, CPU bandwidth, or network bandwidth.

Based on information within one or more alerts (230), the image deployment monitor (299) may generate a configuration recommendation (232). For example, the image deployment monitor (299) may determine that the first deployed copy (291) installed a device driver and shortly afterwards experienced a system crash. In this example, the image deployment monitor (299) may conclude that the installation of the device driver was the cause of the system crash. Based on this conclusion, the configuration recommendation generated by the image deployment monitor (299) may specify an action designed to prevent the crash from occurring in other concurrently deployed copies of the master OS image. For example, the configuration recommendation may include an instruction to add the device driver to the blacklist (280) associated with the second deployed copy (276) and the blacklist (260) associated with the third deployed copy (246).

The image deployment monitor (299) may provide the configuration recommendation (232) to the other deployed copies (276, 246). For example, the other deployed copies (276, 246) may utilize adjustment modules (274, 244) to examine the blacklists (280, 260), the default configurations (282, 262), and other meta data (284, 264), respectively, to determine which installations of software modules to prevent, which hardware and software configurations to apply, and other rules or information associated with deployment. The adjustment modules (274, 244) are capable of utilizing information gathered from other deployed copies. That is, the adjustment modules (274, 244) are capable of modifying a deployed copy of a master OS image using special instructions or via deployment policy settings. In the example of FIG. 2, each of the other deployed copies (276, 246) has an associated directory stored on its client system. However, in other embodiments, the management server may maintain at the management server, a directory for one or more deployed copies.

Figure 3:
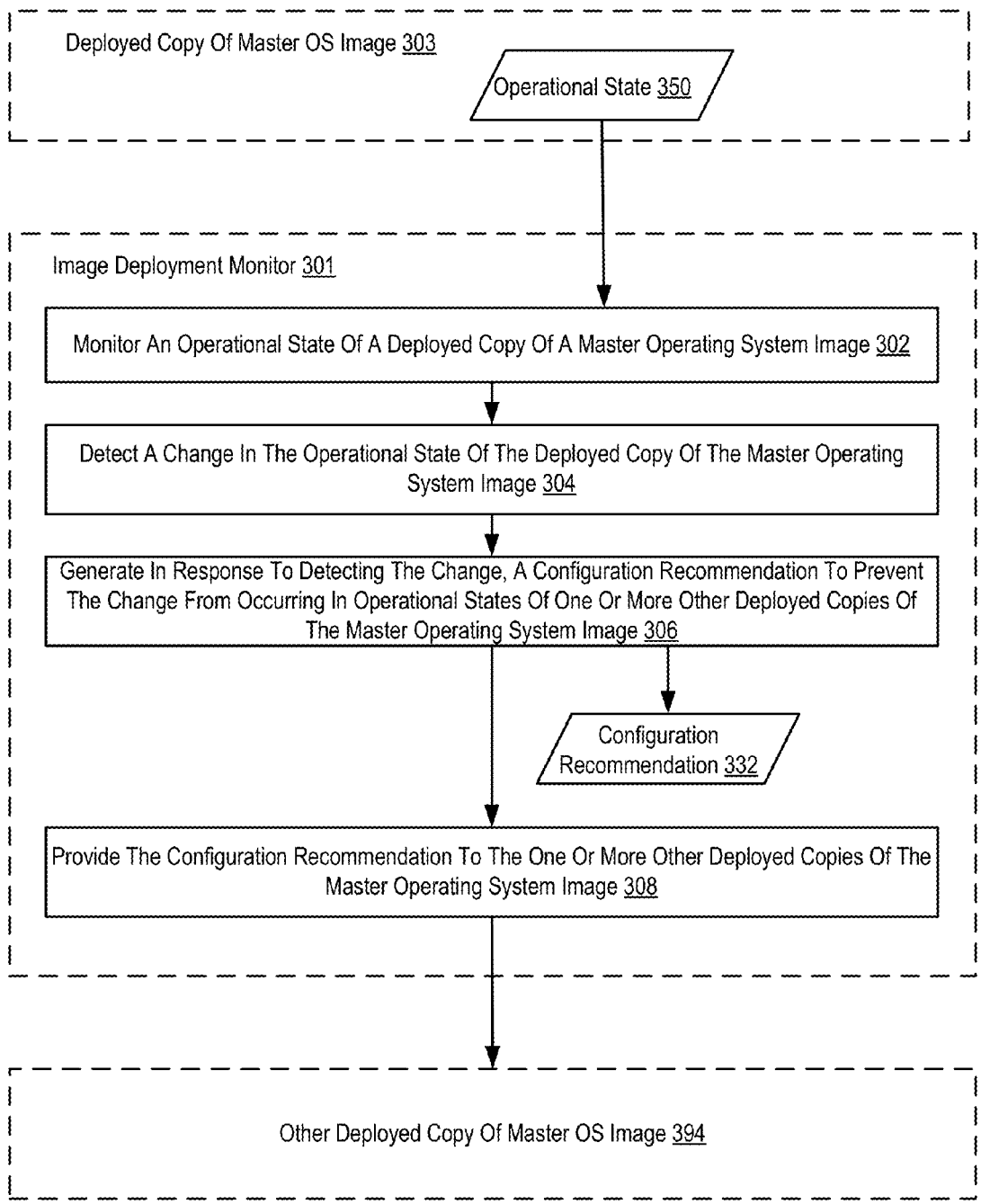
FIG. 3 sets forth a flow chart illustrating an exemplary method for dynamic protection of one or more deployed copies of a master operating system image according to embodiments of the present invention.

For further explanation, FIG. 3 sets forth a flow chart illustrating an exemplary method for dynamic protection of one or more deployed copies of a master operating system image according to embodiments of the present invention. The method of FIG. 3 includes monitoring (302), by an image deployment monitor (301), an operational state (350) of a deployed copy (303) of a master operating system (OS) image (394). Monitoring (302) an operational state (350) of a deployed copy (303) of a master operating system (OS) image (394) may be carried out by installing a monitoring agent on the deployed copy. A monitoring agent may be configured to monitor data metrics such as availability and performance of an operating system and specific applications installed on a system associated with the deployed copy. That is, the image deployment monitor may act as a management hub for collecting and reporting on the data metrics gathered by the monitoring agents.

An operational state may be any type of monitorable characteristics related to the deployed copy. For example, an operational state may indicate a physical state of the system upon which the deployed copy resides, such as temperatures, chassis integrity, power supply, and fan speed. As another non-limiting example, an operational state may be related to server performance, such as SNMP monitoring, hard disk utilization, file integrity and size, memory utilization, CPU utilization, cache utilization, and other processes related to server performance. An operational state may be related to performance of a particular service, such as DNS, HTTP, FTP, Telnet, NNTP, SMTP. An operational state may also relate to network monitoring such as network throughput, current logons, failover/cluster monitoring or web site monitoring, such as hit rate, page content verification, database connection verification, and cache rate. Security parameters may also be indicated by an operational state, such as intrusion monitoring and login error monitoring.

The method of FIG. 3 includes detecting (304), by the image deployment monitor (301), a change in the operational state (350) of the deployed copy (303) of the master OS image (394). Non-limiting examples of changes in operational states include system errors or failures related to a particular monitorable characteristic of a deployed copy. Detecting (304), by the image deployment monitor (301), a change in the operational state (350) of the deployed copy (303) of the master OS image (394) may be carried out by receiving from a monitoring agent, an alert indicating a change in the monitored operational state of a deployed copy. For example, an alert may indicate a particular type of system error, a failure to communicate with a virtual peripheral device, or any other type of information related to an operational state.

The method of FIG. 3 includes generating (306) in response to detecting the change, by the image deployment monitor (301), a configuration recommendation (332) to prevent the change from occurring in operational states of one or more other deployed copies (394) of the master OS image. Generating (306) in response to detecting the change, a configuration recommendation (332) to prevent the change from occurring in operational states of one or more other deployed copies (394) of the master OS image may be carried out by determining a cause of the change in operational state; identifying a preventative action corresponding to the cause of the change; and specifying the preventative action within the configuration recommendation. For example, if the change in an operational state is determined to be due to addition of a software module, the image deployment monitor (301) may specify within the configuration recommendation, a preventative action designed to prevent installation of the software module in other concurrently deployed copies. In this example, the configuration recommendation may indicate a preventative action of adding the software module to a blacklist. As another example, if the change in operational state is due to insufficient resources, such as insufficient network bandwidth, CPU bandwidth, or memory space, the preventative action indicated in the configuration recommendation may specify changing the default configuration of other concurrently deployed copies of the master OS image. In this example, the configuration recommendation may change the amount of network bandwidth, CPU bandwidth, or memory space available to the other concurrently deployed copies of the master OS image.

The method of FIG. 3 also includes providing (308), by the image deployment monitor (301), the configuration recommendation (332) to the one or more other deployed copies (394) of the master OS image. As explained above, a configuration recommendation is designed to prevent a particular change from occurring in other concurrently deployed copies. To accomplish this task, a configuration recommendation may include different types of data. For example, if the configuration recommendation is designed to prevent installation of a particular software component, the configuration recommendation may include data specifying attributes of offending software modules, such as version number, author, and distribution number. Providing (308), by the image deployment monitor (301), the configuration recommendation (332) to the one or more other deployed copies (394) of the master OS image may be carried out by using direct or indirect communication to communicate with other deployed copies.

Figure 4:
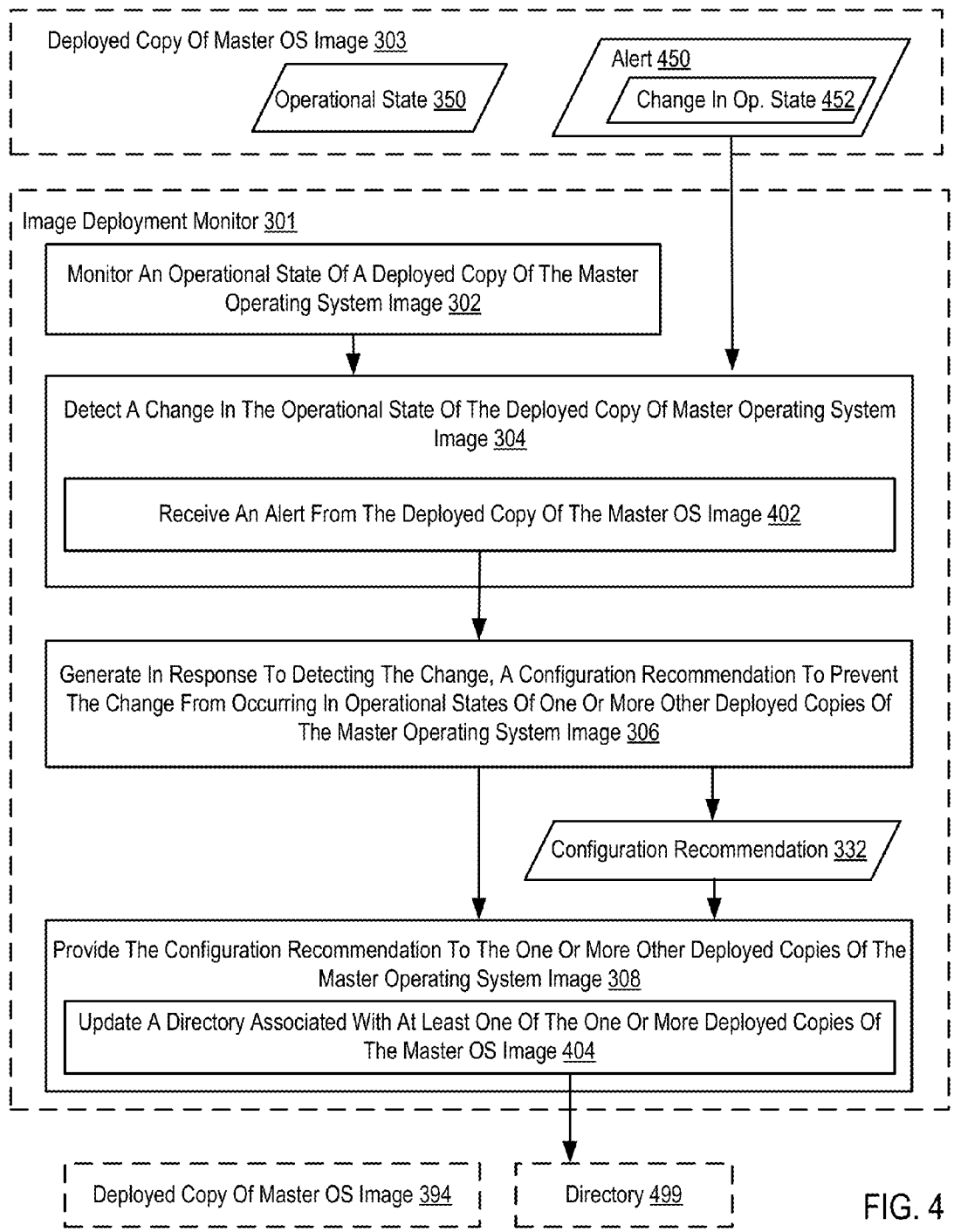
FIG. 4 sets forth a flow chart illustrating a further exemplary method for dynamic protection of one or more deployed copies of a master operating system image according to embodiments of the present invention.

For further explanation, FIG. 4 sets forth a flow chart illustrating a further exemplary method for dynamic protection of one or more deployed copies of a master operating system image according to embodiments of the present invention. The method of FIG. 4 is similar to the method of FIG. 3 in that the method of FIG. 4 also includes monitoring (302) an operational state (350) of a deployed copy (303) of a master operating system (OS) image (394); detecting (304) a change in the operational state (350) of the deployed copy (303) of the master OS image (394); generating (306) in response to detecting the change, a configuration recommendation (332) to prevent the change from occurring in operational states of one or more other deployed copies of the master OS image (394); and providing (308) the configuration recommendation (332) to the one or more other deployed copies of the master OS image (394).

In the method of FIG. 4, however, detecting (304) a change in the operational state (350) of the deployed copy (303) of the master OS image (394) includes receiving (402) an alert from the deployed copy (303) of the master OS image. An alert may indicate an operational state of the deployed copy (291). Examples of operational states may include a system error or loss of contact with a peripheral device. An alert may also indicate a configuration change in the first deployed copy (291). Examples of configuration changes may include installation of a software component, such as a device driver, or modification of a resource allocation, such as changing the size of memory, CPU bandwidth, or network bandwidth. Receiving (402) an alert from the deployed copy (303) of the master OS image may be carried out by communicating directly or indirectly with a deployed copy of a master OS image.

In the method of FIG. 4, however, providing (308) the configuration recommendation (332) to the one or more other deployed copies of the master OS image (394) includes updating (404) a directory (499) associated with at least one of the one or more other deployed copies (394) of the master OS image. A directory may include information collection module useful for dynamic protection of a deployed copy of a master OS image, such as an associated blacklist, a default configuration, and other meta data. A blacklist is a list indicating software modules that have been identified as creating problems on one or more deployed copies of the master OS image. That is, each software module listed in the blacklist has been associated with a negative change in an operational state of a deployed copy of a master OS image. The deployed copies may be configured to use the blacklists to determine which software modules should be prevented from being installed on the deployed copies. A default configuration is a collection of settings associated with deployment of a copy of a master OS image. For example, a default configuration may indicate how a particular drive is to be partitioned, memory allocated, and CPU and network bandwidth distribution. Other meta data may include rules, procedures, or any other type of information that may relate to deployment and execution of a copy of a master OS image. Updating (404) a directory (499) associated with at least one of the one or more other deployed copies (394) of the master OS image may be carried out by instructing a deployed copy to make a change to a blacklist, default configuration, or other meta data.

Exemplary embodiments of the present invention are described largely in the context of a fully functional computer system for dynamic protection of one or more deployed copies of a master operating system image. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamic protection of one or more deployed copies of a master operating system image, the method comprising:

monitoring, by an image deployment monitor executing on a management server, an operational state of a first deployed copy of a master operating system (OS) image executing on a first client system, wherein the first client system is connected to the management server over a data communications network;

detecting, by the image deployment monitor, a change in the operational state of the deployed copy of the master OS image executing on the first client system;

in response to detecting the change, generating, by the image deployment monitor, a configuration recommendation to prevent the change in the operational state of the first deployed copy of the master OS image executing on the first client system from occurring in an operational state of a second deployed copy of the master OS image executing on a second client system, wherein the configuration recommendation recommends, for the second deployed copy of the master OS image executing on the second client system, a specific change in size of a resource allocation of a resource; wherein the second deployed copy of the master OS image executing on the second client system includes an adjustment module configured to modify the second deployed copy of the master OS image based on the configuration recommendation; and providing, by the image deployment monitor, the configuration recommendation to the second deployed copy of the master OS image executing on the second client system.

2. The method of claim 1 wherein providing, by the image deployment monitor, the configuration recommendation to the one or more other deployed copies of the master OS image includes updating a directory associated with at least one of the one or more deployed copies of the master OS image; and
wherein the directory indicates at least one of default configurations settings for an operating system within the deployed copies of the master OS image and a list of blacklisted components.

3. The method of claim 1 wherein the configuration recommendation recommends a change to default configuration settings for an operating system within the deployed copies of the master OS image.

4. The method of claim 1 wherein the configuration recommendation recommends addition of a software component to a list of components blacklisted from being installed on the deployed copies of the master OS image.

5. The method of claim 1 wherein detecting, by the image deployment monitor, a change in the operational state of the deployed copy of a master OS image includes receiving an alert from the deployed copy of the master OS image; and
wherein the alert indicates the change in the operational state of the deployed copy of the master OS image.

6. The method of claim 1 wherein each of the one or more deployed copies of the master OS image includes an adjustment module configured to modify the deployed copies of the master OS image based on the configuration recommendation.

* * * * *